(12) United States Patent
Yeh et al.

(10) Patent No.: US 9,563,107 B2
(45) Date of Patent: Feb. 7, 2017

(54) IMAGING DEVICE

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Chin-Wen Yeh, New Taipei (TW); Dun-Jun Zhou, Wuhan (CN)

(73) Assignees: HONG FU JIN PRECISION INDUSTRY (WuHan) CO., LTD., Wuhan (CN); HON HAI PRECISION INDUSTRY CO., LTD., New Taipei (TW)

(*) Notice: Subject to any disclaimer, the term of this patent is extended or adjusted under 35 U.S.C. 154(b) by 77 days.

(21) Appl. No.: 14/543,430

(22) Filed: Nov. 17, 2014

(65) Prior Publication Data
US 2016/0109786 A1    Apr. 21, 2016

(30) Foreign Application Priority Data
Oct. 15, 2014  (CN) .......................... 2014 1 0543834

(51) Int. Cl.
*G03B 21/20* (2006.01)
*H04N 9/31* (2006.01)
*G03B 21/14* (2006.01)

(52) U.S. Cl.
CPC ........... *G03B 21/142* (2013.01); *G03B 21/208* (2013.01); *H04N 9/3152* (2013.01)

(58) Field of Classification Search
CPC . G03B 21/142; G03B 21/2046; G03B 21/208; G03B 21/2093; G03B 21/20; G03B 21/53; G03B 21/14; H04N 9/315; H04N 9/3152; G02B 7/04; G02B 7/10
USPC ...... 362/277, 311.01, 311.06, 311.09, 311.1, 362/311.12; 353/100, 101, 119; 359/808, 359/819, 822, 823, 826
See application file for complete search history.

(56) References Cited

U.S. PATENT DOCUMENTS

| | | | | |
|---|---|---|---|---|
| 5,860,721 A | * | 1/1999 | Bowron | H04N 9/3152 348/E5.137 |
| 7,815,318 B2 | * | 10/2010 | Hsu | G03B 21/28 348/771 |
| 2006/0279713 A1 | * | 12/2006 | Wang | G03B 21/2046 353/101 |
| 2007/0176107 A1 | * | 8/2007 | Lin | H04N 9/3102 250/370.08 |
| 2010/0053573 A1 | * | 3/2010 | Wen | G02B 7/021 353/101 |

FOREIGN PATENT DOCUMENTS

TW          200400375 A        1/2004

* cited by examiner

*Primary Examiner* — William C Dowling
*Assistant Examiner* — Ryan Howard
(74) *Attorney, Agent, or Firm* — Zhigang Ma

(57) ABSTRACT

An imaging device includes a main body, a light pipe, a shell, and a lens assembly. The light pipe is attached to the main body. The shell is configured to couple to the main body; thereby an accommodating space is defined between the shell and the main body. The lens assembly has an external sleeve and a lens. The lens is movably coupled to the accommodating space by the external sleeve, thereby enabling adjustment of a distance between the lens and the light pipe.

20 Claims, 7 Drawing Sheets

IMAGING DEVICE

FIELD

The subject matter herein generally relates to imaging devices.

BACKGROUND

Imaging devices, such as projectors, usually include lens assemblies. The lens assemblies usually have at least one lens and a light source. A position of the light source is adjusted relative to the lenses for focusing and imaging.

BRIEF DESCRIPTION OF THE DRAWINGS

Implementations of the present technology will now be described, by way of example only, with reference to the attached figures.

DETAILED DESCRIPTION

Figure 1:
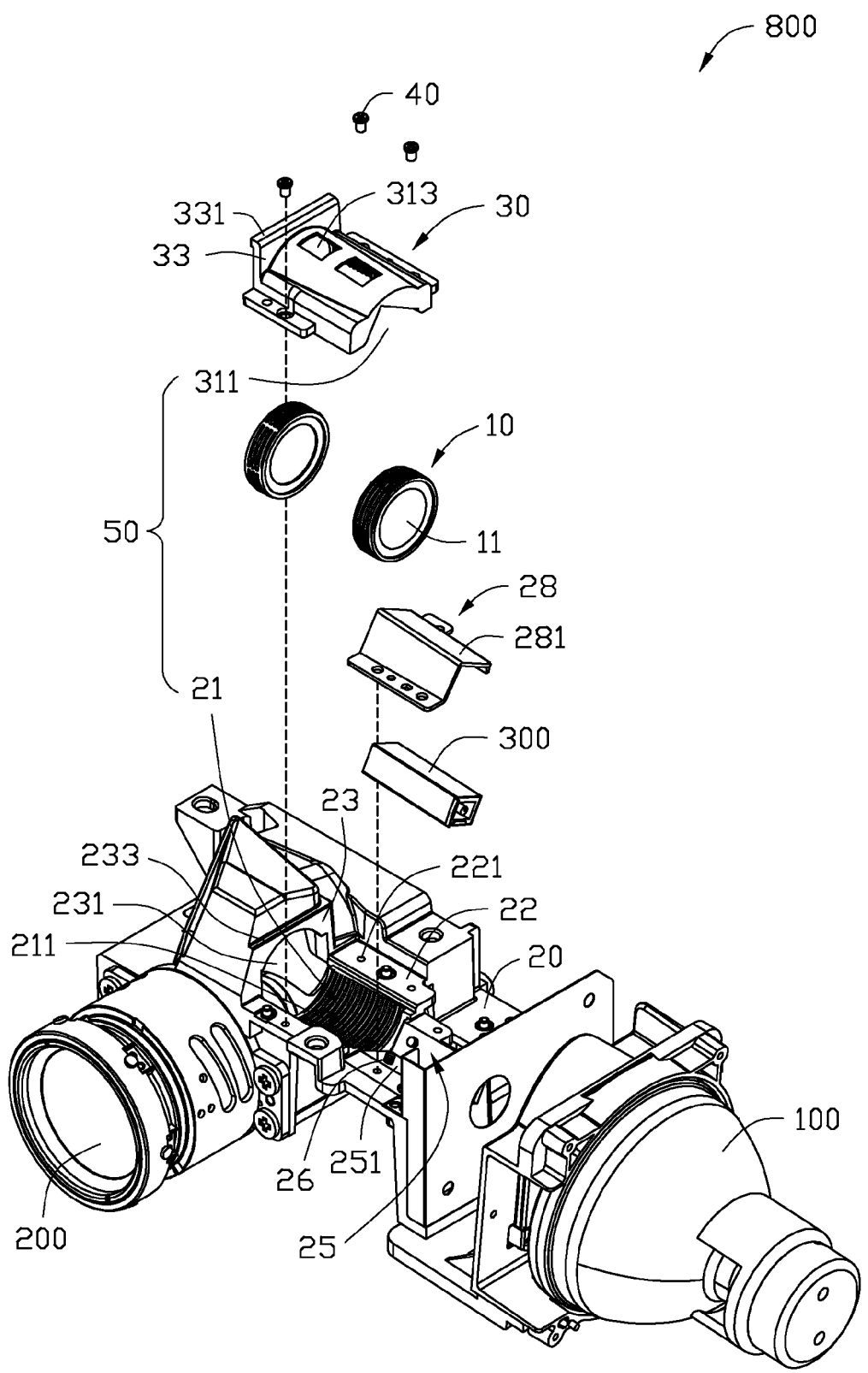
FIG. 1 is an exploded view of an embodiment of an imaging device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series, and the like.

The present disclosure is described in relation to an imaging device. The imaging device includes a main body, a light pipe, a shell, and a lens assembly. The light pipe is attached to the main body. The shell is configured to couple to the main body; thereby an accommodating space is defined between the shell and the main body. The lens assembly has an external sleeve and a lens. The lens is movably coupled to the accommodating space by the external sleeve, thereby the movement of the lens assembly adjusts a distance between the lens and the light pipe.

FIG. 1 illustrates an imaging device that can include a main body 20, a shell 30, a light source 100, a light pipe 300, and at least one lens assembly 10. The light source 100 is coupled to one side of the main body 20. The light pipe 300 and the lens assembly 10 are both movably coupled to the main body 20. The light pipe 300 is aligned with and located between the light source 100 and the lens assembly 10. In at least one embodiment, the imaging device is a projector with a projection lens 200 and two lens assemblies 10.

A first groove 21 and a receiving groove 25 are defined in the main body 20. The first groove 21 abuts and communicates with the receiving groove 25. The first groove 21 is configured to accommodate the lens assemblies 10, and the receiving groove 25 is configured to accommodate the light pipe 300. The first groove 21 is substantially a semicircle and a first internal thread 211 is formed therein. Two support surfaces 22 extend from the first groove 21 and are configured to support the shell 30. Several latch holes 221 are defined in each support surface 22 for coupling to the shell 30. The receiving groove 25 includes two bottom surfaces 251 for supporting the light pipe 300. The bottom surfaces 251 are substantially perpendicular to each other. An operation member 26 passes through each bottom surface 251 and is inserted into the receiving groove 25. Each operation member 26 is movable relative to the receiving groove 25 and is configured to move the light pipe 300 relative to the receiving groove 25. A side surface 23 extends from the main body 20 and is substantially perpendicular to an axial direction of the first groove 21. An inlet 231 is defined in the side surface 23 and is aligned with the first groove 21. A step surface 233 is formed upon the side surface 23 and configured to support the shell 30. The main body 20 further includes a cover 28 coupling to the receiving groove 25. The cover 28 is configured to cover the light pipe 300 located in the receiving groove 25. In at least one embodiment, the cover 28 includes two cover portions 281.

Figure 2:
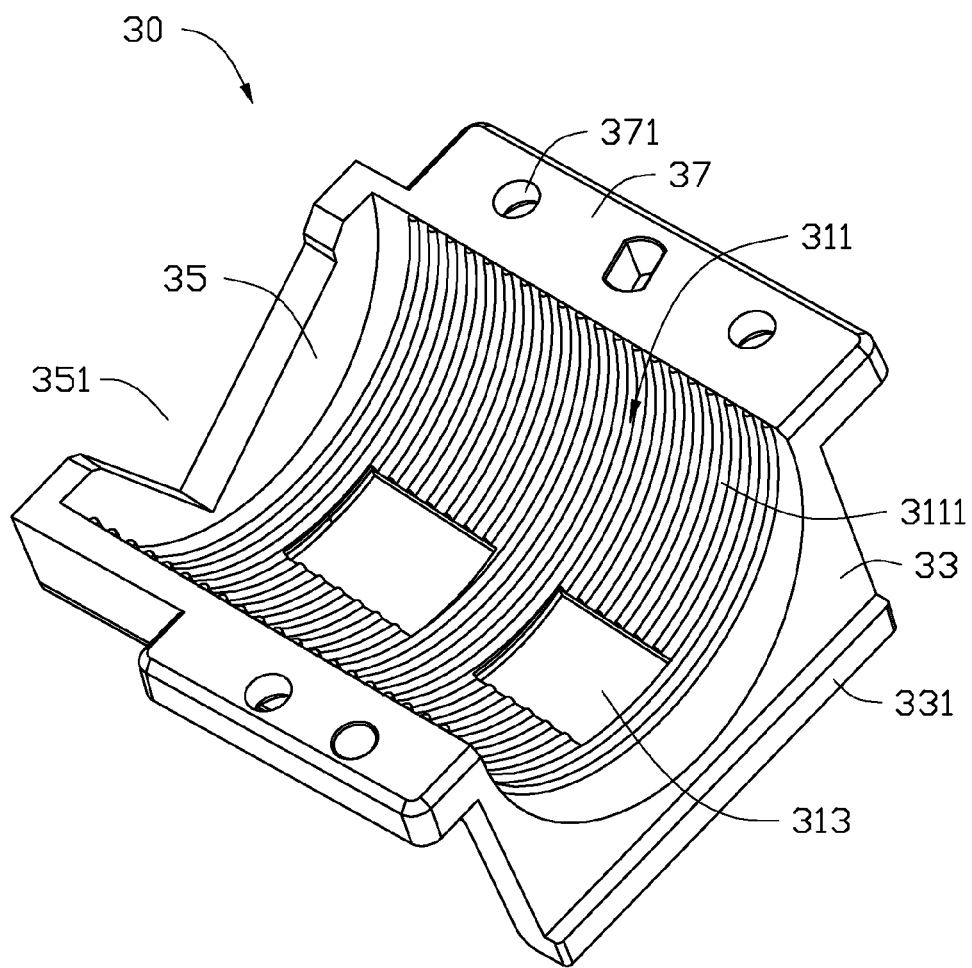
FIG. 2 is an isometric view of a shell of the imaging device of FIG. 1, viewed from another angle.

FIG. 1-2 illustrate that a second groove 311 is defined in the shell 30. The second groove 311 is configured to accommodate the lens assemblies 10. The second groove 311 is substantially a semicircle and a second internal thread 3111 is formed therein. In at least one embodiment, the first groove 21 and the second groove 311 are symmetrical about the axis. The shell 30 is configured to couple to the main body 20 and be positioned upon the first groove 21. An accommodating space 50 is defined between the shell 30 and the main body 20 and configured to accommodate the lens assemblies 10. The inlet 231 is large enough to allow the lens assemblies 10 to be coupled to the accommodating space 50. The accommodating space 50 is formed by the coupling first groove 21 and the second groove 3111, thereby a complete and integrated internal thread is formed in the accommodating space 50. A through hole 313 is defined in the shell 30 corresponding to each lens assembly 10. Each through hole 313 communicates with the accommodating space 50, thereby each lens assembly 10 is configured to be exposed from a through hole 313. The lens assemblies 10 are within reach via the through holes 313 and can be manipulated. Two securing pieces 37 extend from two opposite lengthwise edges and are configured to couple to the support surfaces 22. Several securing holes 371 are defined in each securing piece 37 corresponding to the latch holes 221. A side plate 33 extends from one side of the shell 30 and is configured to abut the side surface 23. A flange 331 extends from and is substantially perpendicular to the side plate 33. The flange 331 is configured to abut the step surface 233. A limiting piece 35 extends from an opposite side of the shell 30. A cutout 351 is defined in the limiting piece 35. The cutout 351 is large enough to allow the light pipe 300 to pass through. In at least one embodiment, the cutout is substantially V-shaped.

Figure 3:
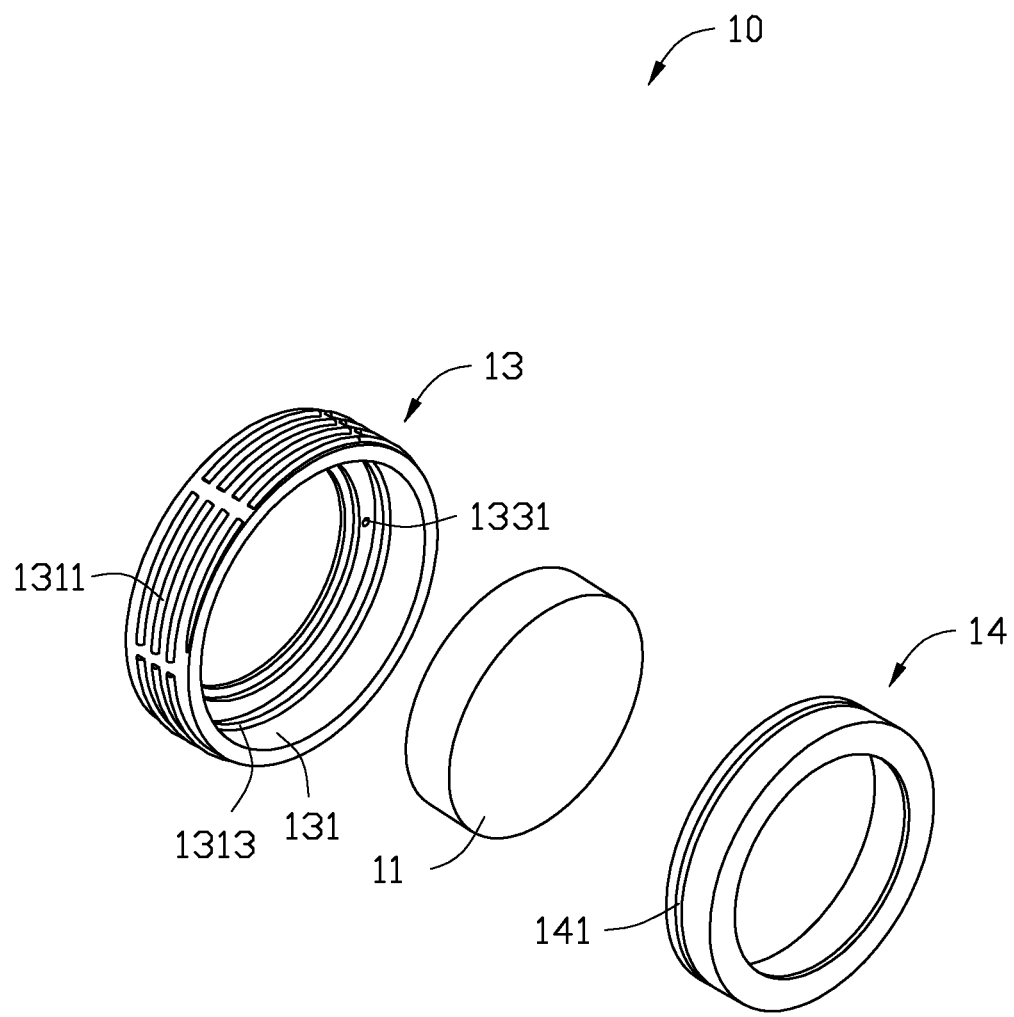
FIG. 3 is an exploded view of a lens assembly of the imaging device of FIG. 1.

FIG. 3 illustrates that each lens assembly 10 can include a lens 11, an external sleeve 13, and an internal sleeve 14. The external sleeve 13 is configured to movably couple the lens 11 to the accommodating space 50. The internal sleeve 14 is configured to be coupled into the external sleeve 13. The lens 11 is sandwiched between the internal sleeve 14 and the external sleeve 13. Opposite sides of the lens 11 are exposed from each of the external sleeve 13 and the internal sleeve 14. The external sleeve 13 includes a surround portion 131 which surrounds the lens 11. An external thread 1311 is formed in the surround portion 131 corresponding to the first internal thread 211 and the second internal thread 3111. A recess 141 is defined in the external surface of the internal sleeve 14. A latch portion 1313 extends from the internal surface of the external sleeve 13. The latch portion 1313 is configured to latch to the recess 141, thereby the external sleeve 13 and the internal sleeve 14 are firmly coupled together. At least one gap 1331 is defined in the external sleeve 13 for conveniently coupling the lens assembly to the accommodating space 50. In at least one embodiment, two gaps 1331 are defined in the external sleeve 13.

Figure 4:
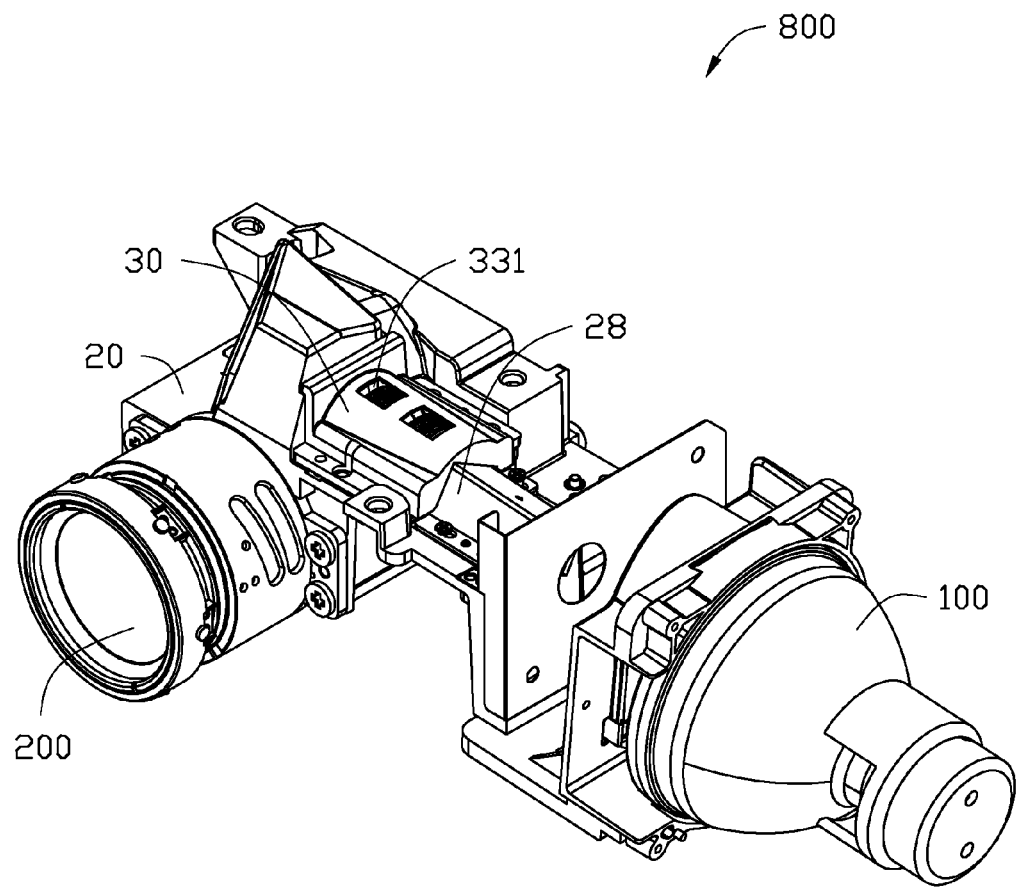
FIG. 4 is an assembled view of the imaging device of FIG. 1.
Figure 5:
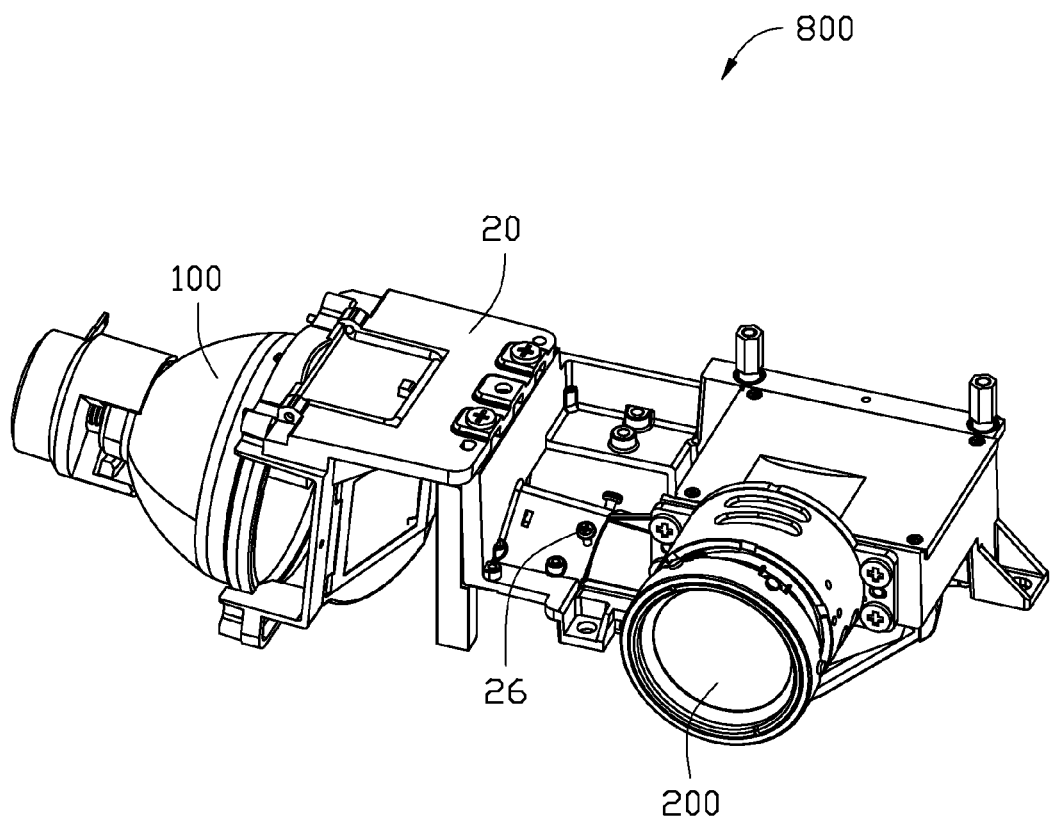
FIG. 5 is similar to FIG. 4, but viewed from another angle.

FIGS. 4-5 illustrate an assembly of the imaging device. The shell 30 and the cover 28 are coupled to the main body 20 by fasteners 40 or other common means such as adhesively.

The light pipe 300 is movably received into the receiving groove 25. The light pipe 300 is aligned to the lens assemblies 10. A front of the light pipe 300 extends into the accommodating space 50 via the cutout 351. An axial direction of the light pipe 300 is substantially parallel to an axial direction of the accommodating space 50. Positions of the light pipe 300 relative to the receiving groove 25 can be changed by the operation members 26. The lens assemblies 10 are movably received in the accommodating space 50. Each lens assembly 10 is exposed from each through hole 313 and is capable of being manipulated via the through hole 313. Each lens assembly 10 can be manually rotated relative to the main body 20. When each lens assembly 10 is rotated, the lens assembly 10 slides relative to the main body 20 along the axial direction of the accommodating space 50. Positions of the lens assemblies 10 relative to the accommodating space 50 can be changed by the rotation. A distance between the lens assemblies 10 and the light pipe 300 is adjustable by the movement of the lens assemblies 10, thereby a means of improving the quality of an image formed by the imaging device can exist.

Figure 6:
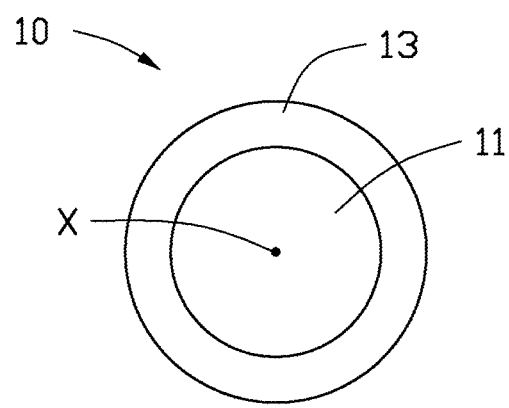
FIG. 6 is a diagrammatic view of the lens and the external sleeve of FIG. 3 in an embodiment.

FIG. 6 illustrates that, in at least one embodiment, the lens 11 and the external sleeve 13 of each lens assembly 10 have the same central axis X. When each lens assembly 10 is rotated, a distance between each lens 11 and the light pipe 300 is changed.

Figure 7:
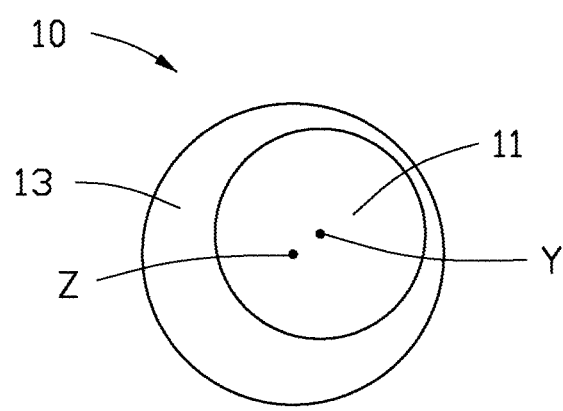
FIG. 7 is a diagrammatic view of the lens and the external sleeve of FIG. 3 in another embodiment.

FIG. 7 illustrates that, in another embodiment, a central axis Y of each lens 11 is not in line with a central axis Z of each external sleeve 13 in each lens assembly 10. When each lens assembly 10 is rotated, the lens 11 is configured to be rotated about the central axis Z of the external sleeve 13.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims.

What is claimed is:

1. An imaging device comprising:
a main body defining a receiving groove;
a light pipe attached to the main body;
a shell configured to couple to the main body;
an operation member;
an accommodating space defined between the shell and the main body; and
a lens assembly, having an external sleeve and a lens;
wherein the operation member is movable relative to the receiving groove to move the light pipe relative to the receiving groove, so that positions of the light pipe relative to the receiving groove are capable of being changed, and the lens is movably coupled to the accommodating space by the external sleeve, thereby enabling adjustment of a distance between the lens and the light pipe.

2. The imaging device of claim 1, wherein the lens assembly is configured to move relative to the main body along an axial direction of the accommodating space.

3. The imaging device of claim 1, wherein the lens assembly further comprises an internal sleeve configured to couple to the external sleeve, and the lens is sandwiched between the internal sleeve and the external sleeve.

4. The imaging device of claim 3, wherein two opposite sides of the lens are exposed from each of the external sleeve and the internal sleeve.

5. The imaging device of claim 3, wherein a recess is defined in the internal sleeve, and a latch portion extends from the external sleeve and is configured to latch to the recess.

6. The imaging device of claim 1, wherein the external sleeve comprises a surround portion, and an external thread is formed in the surround portion to movably couple the lens assembly to the accommodating space.

7. The imaging device of claim 6, wherein two internal threads are formed in each of the main body and the shell to form an integrated internal thread in the accommodating space.

8. The imaging device of claim 1, wherein a central axis of the lens is deviated from a central axis of the external sleeve, and the lens is configured to be rotated about the central axis of the external sleeve.

9. The imaging device of claim 1, wherein the lens and the external sleeve are coaxial.

10. The imaging device of claim 1, wherein an axial direction of the light pipe is substantially parallel to the axial direction of the accommodating space.

11. An imaging device comprising:
a main body defining a receiving groove;
a light pipe attached to the main body;
an operation member;
a shell configured to couple to the main body, an accommodating space is defined between the shell and the main body;

a lens assembly movably received in the accommodating space; and a through hole defined in the shell and communicating with the accommodating space, configured to expose the lens assembly;

wherein the operation member is movable relative to the receiving groove to move the light pipe relative to the receiving groove, so that positions of the light pipe relative to the receiving groove are capable of being changed, and the lens assembly is touchable via the through hole to move along an axial direction of the accommodating space.

12. The imaging device of claim 11, wherein the lens assembly comprises a lens and an external sleeve, and the external sleeve is configured to movably couple the lens to the accommodating space.

13. The imaging device of claim 12, wherein the lens assembly further comprises an internal sleeve configured to couple to the external sleeve, and the lens is sandwiched between the internal sleeve and the external sleeve.

14. The imaging device of claim 13, wherein two opposite sides of the lens are exposed from each of the external sleeve and the internal sleeve.

15. The imaging device of claim 13, wherein a recess is defined in the internal sleeve, and a latch portion extends from the external sleeve and is configured to latch to the recess.

16. The imaging device of claim 12, wherein the external sleeve comprises a surround portion, and an external thread is formed in the surround portion to movably couple the lens assembly to the accommodating space.

17. The imaging device of claim 16, wherein two internal threads are formed in each of the main body and the shell to form an integrated internal thread in the accommodating space.

18. The imaging device of claim 12, wherein at least one gap is defined in the external sleeve for conveniently coupling the lens assembly to the accommodating space.

19. The imaging device of claim 11, wherein a central axis of the lens is deviated from a central axis of the external sleeve, and the lens is configured to be rotated about the central axis of the external sleeve.

20. The imaging device of claim 11, wherein the lens and the external sleeve are coaxial.

* * * * *